(12) United States Patent
Sakuma (10) Patent No.: US 6,363,604 B1
(45) Date of Patent: Apr. 2, 2002

(54) METHOD AND APPARATUS FOR CUTTING BRAIDED SHEATH OF SHIELDING WIRE

(75) Inventor: Teiji Sakuma, Nagoya (JP)

(73) Assignees: Autonetworks Technologies, Ltd., Nagoya; Sumitomo Wiring Systems, Ltd., Mie; Sumitomo Electric Industries, Ltd., Osaka, all of (JP)

( * ) Notice: Subject to any disclaimer, the term of this patent is extended or adjusted under 35 U.S.C. 154(b) by 0 days.

(21) Appl. No.: 09/517,630

(22) Filed: Mar. 3, 2000

(30) Foreign Application Priority Data

May 21, 1999 (JP) ............................. 11-141392

(51) Int. Cl.[7] ............................. B23P 19/04; H02G 1/12
(52) U.S. Cl. ..................... 29/566.1; 29/564.4; 81/9.51
(58) Field of Search ........................... 29/566.1, 564.4, 29/867; 81/9.51

(56) References Cited

U.S. PATENT DOCUMENTS

| | | | |
|---|---|---|---|
| 2,376,858 A | | 5/1945 | Barrans et al. |
| 2,929,285 A | * | 3/1960 | Gulemi ........................ 81/9.51 |
| 3,044,333 A | * | 7/1962 | Broske ........................ 81/9.51 |
| 3,153,358 A | * | 10/1964 | Havens ........................ 81/9.51 |
| 3,171,306 A | * | 3/1965 | Mirsch ........................ 81/9.51 |
| 3,267,774 A | * | 8/1966 | Bilco et al. ................... 81/9.51 |
| 3,577,814 A | * | 5/1971 | Hammond .................... 81/9.51 |
| 3,721,138 A | | 3/1973 | Kamimura et al. |
| 4,763,410 A | * | 8/1988 | Schwartzman .............. 81/9.51 |
| 4,914,986 A | * | 4/1990 | Masaki ........................ 81/9.51 |
| 5,058,260 A | * | 10/1991 | Gloe et al. ................. 29/564.4 |
| 5,072,632 A | * | 12/1991 | Sayyadi ....................... 81/9.51 |
| 5,074,169 A | * | 12/1991 | Matz ........................... 81/9.51 |
| 5,905,650 A | * | 5/1999 | Tsutsui et al. ................ 700/110 |
| 6,243,947 B1 | * | 6/2001 | Fujita et al. .................. 29/867 |

FOREIGN PATENT DOCUMENTS

| | | | |
|---|---|---|---|
| DE | 40 27 904 A | | 3/1992 |
| JP | 6-22427 A | * | 1/1994 |
| JP | A-10-267993 | | 10/1998 |
| JP | 2000-102133 A | * | 4/2000 |

* cited by examiner

Primary Examiner—William Briggs
Assistant Examiner—Erica E Cadugan
(74) Attorney, Agent, or Firm—James A. Oliff, PLC (57) ABSTRACT

Firstly, the tip portion of the braided sheath S3 exposed at the terminal thereof by stripping the outer jacket off S4 is widened into the shape of a funnel. Then the internal blades 9 disposed in the shape of a two-piece cylinder hold the periphery of the portion of the braided sheath not to be removed, and the cylindrical external blade 16 is inserted between the braided sheath $S_3$ and the internal insulating material $S_2$ to catch and cut the braided sheath $S_3$ by means of the external blade 16 and the internal blades 16a and 9a.

7 Claims, 9 Drawing Sheets

METHOD AND APPARATUS FOR CUTTING BRAIDED SHEATH OF SHIELDING WIRE

BACKGROUND OF THE INVENTION

The present invention relates to a method and an apparatus for cutting a braided sheath away from the terminal of a shielding wire by a prescribed length.

Figure 14:
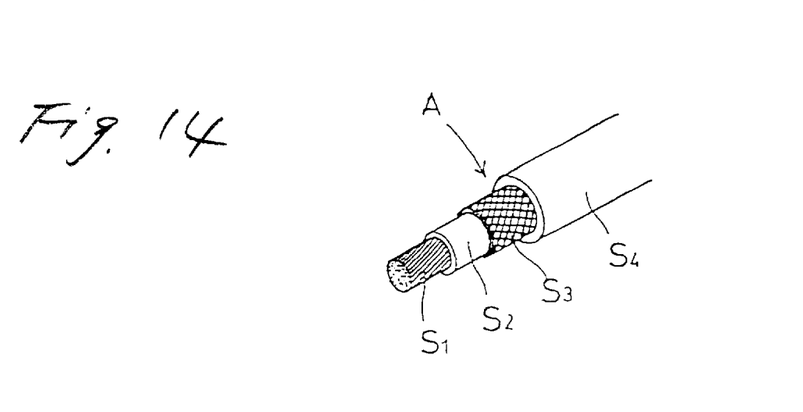
FIG. 14 is a perspective view showing an example of the shielding wire to be processed.
Figure 17:
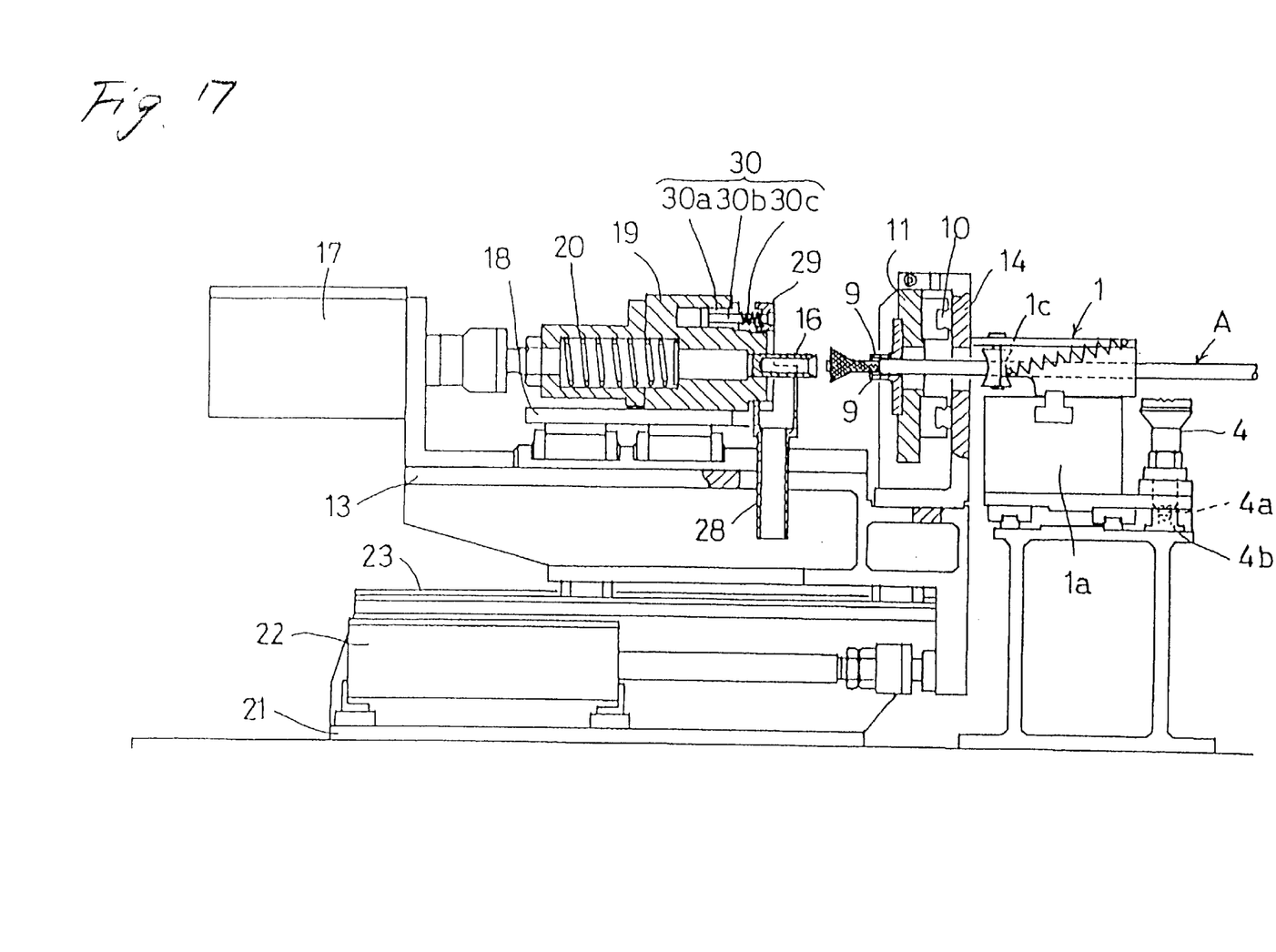

A shielding wire is constructed in such a manner that a conductor $S_1$ is covered by an internal insulating material $S_2$, and then covered by a braided sheath $S_3$ having conductivity thereon, and then by an outer insulating jacket $S_4$ in succession, as shown in FIG. 14.

In order to connect a terminal or the like to the terminal of the shielding wire A, the outer jacket $S_4$ is stripped away from the terminal thereof by a prescribed length, and then the braided sheath $S_3$ is reversed and folded back onto the outer jacket $S_4$ or cut off by an appropriate length, and thereafter the exposed internal insulating material $S_2$ is stripped off by a prescribed length to expose the conductor $S_1$.

As one of methods for cutting a braided sheath away in such terminal processing, the braided sheath may be incised from the periphery thereof by means of a cutting tool and removed, concurrently with strip-off operation of the outer jacket.

There is another method for cutting a braided sheath away which comprises the steps of: holding the portion in the vicinity of the tip of the exposed braised sheath by means of internal blades of the two-piece cutting tool after the outer jacket is stripped off; moving the internal blades toward the other end of the wire to loosen and dilate the portion of braided sheath corresponding to the section between the cut end of the outer jacket and the internal blades radially; and cutting the dilated portion of the braided sheath created in front of the internal blades by intersecting the external blade therewith.

However, the former of the above-described methods has a disadvantage in that when cutting the braided sheath, the blade may damage the internal insulating material in case where the blade reaches the internal insulating material.

While the latter of the above-described methods has no possibility to damage the internal insulating material because the braided sheath is cut after it is isolated from the internal insulating material. However, this method is operable only when the length to be stripped off is longer than the length to be held by the internal blades, which gives limitations to the conditions of processing (the length to be stripped off).

SUMMARY OF THE INVENTION

In order to avoid the disadvantages hitherto described, the present invention proposes a method and an apparatus for cutting a braided sheath, which does not damage the internal insulating material and gives fewer limitations to the processing conditions.

As a measure to solve the problems described so far, the present invention provides a method for cutting a braided sheath of a shielding wire comprising the steps of: widening a tip of the braided sheath exposed at a terminal portion of the shielding wire by stripping an outer jacket into a shape of a funnel; holding a periphery of a portion of the braided sheath not to be removed with internal blades in a shape of a two-piece cylinder; moving the shielding wire including the internal blades relative to a cylindrical external blade opposed to the internal blades along a longitudinal direction of the wire with respect to each other; inserting the external blade from the terminal side of the wire between the braided sheath and the internal insulating material; and cutting the portion of the braided sheath isolated from the internal insulating material by means of the external blade and the internal blades.

As an apparatus to perform this method, there is provided an apparatus comprising; a clamp mechanism for registering and holding the shielding wire at the center of the position where a processing is carried out; a widening mechanism for widening the tip of the braided sheath which is exposed at the terminal of the wire by stripping the outer jacket off; and a cutting mechanism including the internal blades disposed in the shape of a two-piece cylinder and a cylindrical external blade supported by a slider and opposed to the internal blades.

Preferably, the cutting apparatus of the present invention further comprises a sliding mechanism for moving the internal blades along a longitudinal direction of the wire; and a suction unit for collecting chips of the braided sheaths, wherein, upon completion of cutting operation, the external blade is retracted, the internal blades moves toward the external blade to remove the chip of the braided sheath, and the chips is sucked and collected by means of the suction unit waiting thereunder.

Preferably, the widening mechanism to be used in this apparatus warps the tip of the braided sheath by pressing the portion in the vicinity of the tip thereof from the outside, then grasps the portion of the braided sheath not to be removed with a clamp having grooves of a semi-circular cross section, and inserts a cylindrical body between the braided sheath with the tip widened outwardly and the internal insulating material to further widen the area of the braided sheath to be removed with the cylindrical body.

In the method and apparatus according to the present invention, the braided sheath is cut off by the steps of inserting the cylindrical external blade into the interior of the braided sheath widened in the shape of a funnel to isolate the cutting point of the braided sheath from the internal insulating material of the wire, and clamping the isolated portion with the cylindrical internal and external blades which moves relative to each other longitudinally of the wire before cutting. Therefore, there is no risk to damage the internal insulating material.

In addition, since the cutting point of the braided sheath may be freely changed by the position control of the cylindrical internal blades, the length of the braided sheath to be stripped off, which is determinedby the position of the cutting point, may be chosen quite freely.

BRIEF DESCRIPTION OF THE DRAWINGS

FIG. 7 is a cross sectional view of the center portion of the apparatus shown in FIG. 6;

DETAILED DESCRIPTION OF THE PREFERRED EMBODIMENTS

Referring now to the drawings, preferred embodiments of the apparatus for cutting the braided sheath according to the invention will be described.

A unit designated by the reference number 1 in the figures denotes a clamping unit. The clamping unit 1 registers and holds the shielding wire (hereinafter referred to as wire) A at the center of the position where the processing is carried out by means of clamp claws 1b provided on the an air chuck 1a and having a pair of V-shaped grooves facing with each other. The clamping unit 1 includes a pair of arms 1c which open and close together with the clamp claws 1b, and clamp the terminal of the wire A loosely with grooved rollers 1d provided on the ends of the arms 1c. The arms 1c are slidably mounted on the air chucks 1a and energized longitudinally of the wire by springs 1e toward the left side of the figure.

The clamping unit 1 is mounted on the slider 3 which is guided by linear guides 2, and delivered to a plurality of processing stations by lateral movement of the slider 3. The slider 3 is provided with a index plunger 4 as shown in FIG. 7 and registered at each processing station by fitting a pin 4a provided on the lower portion of the plunger 4 into a bushing 4b provided at each processing station.

Figure 1:
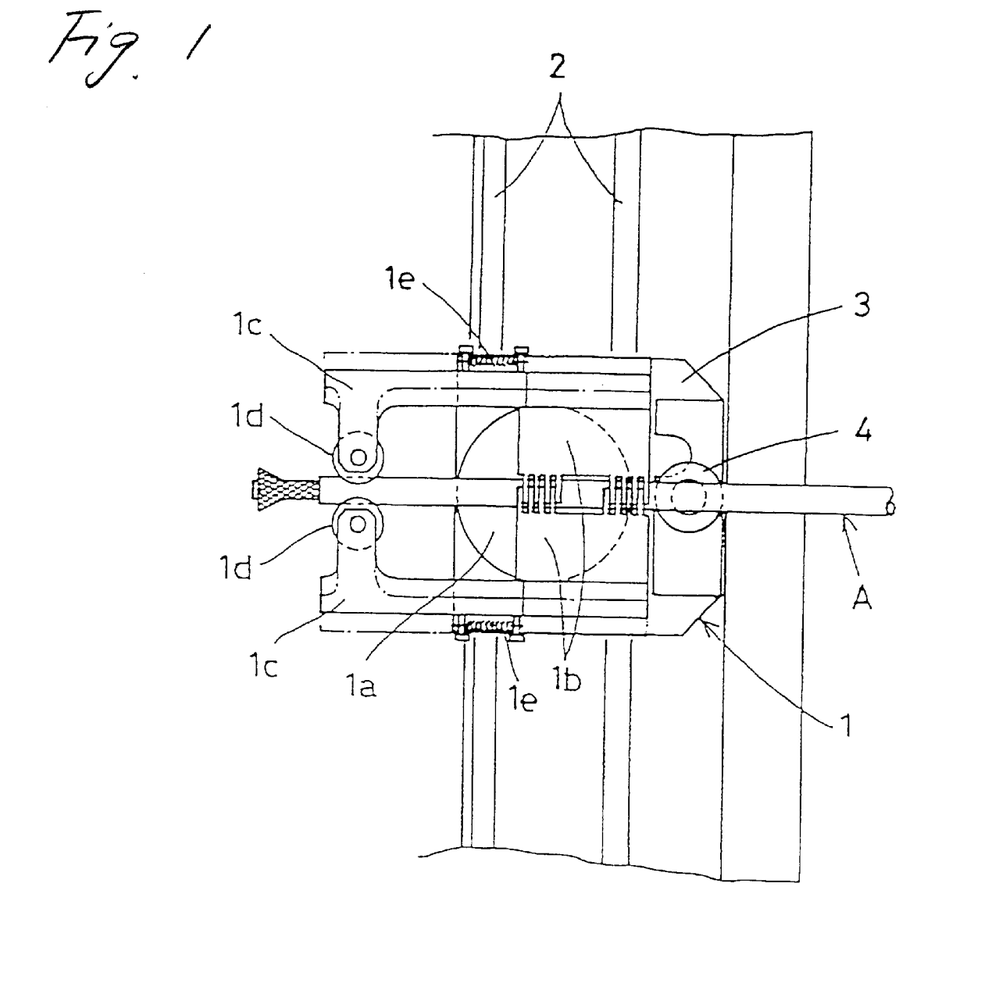
FIG. 1 is a plan view of the clamping unit included in the apparatus according to the present invention.
Figure 2:
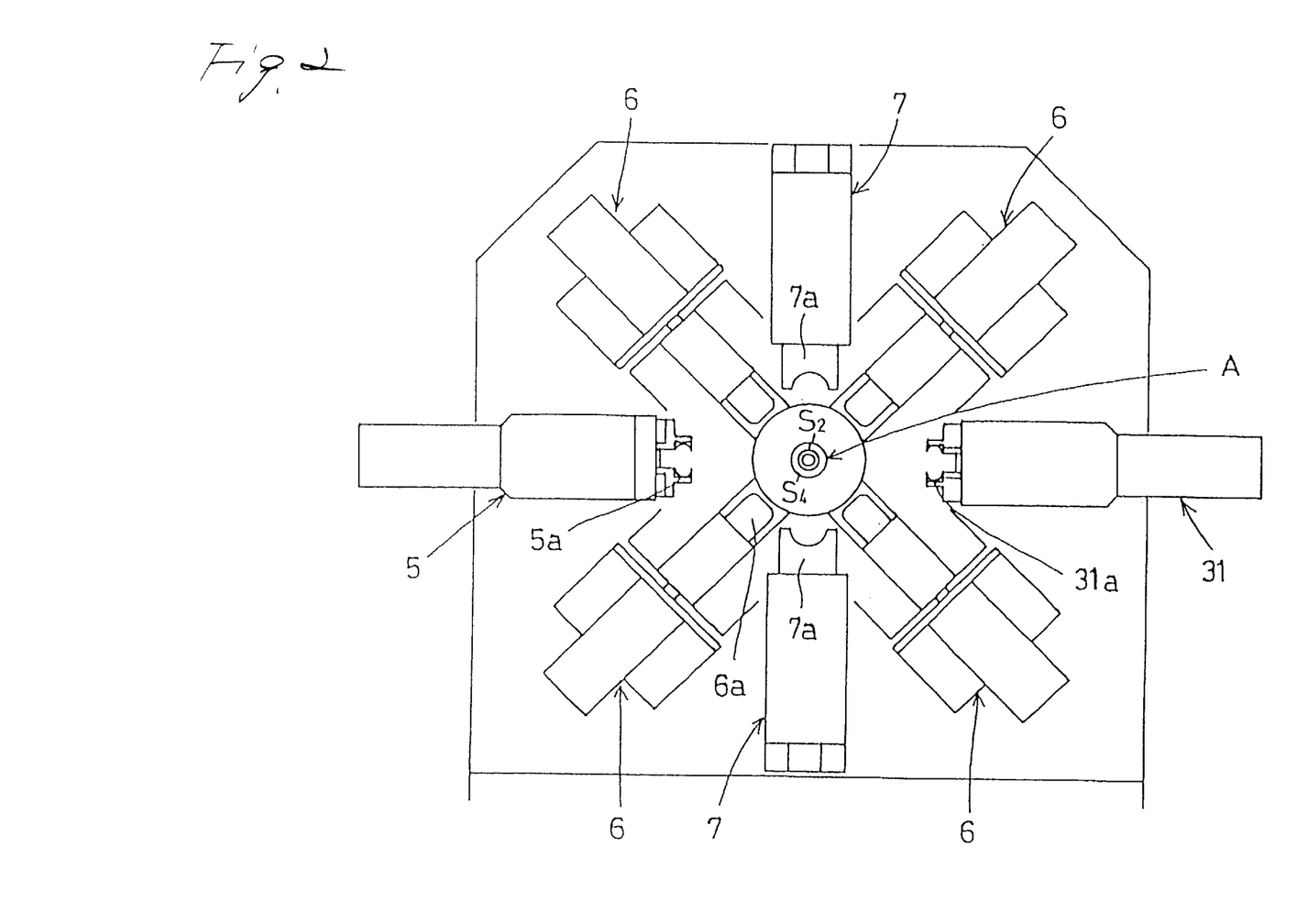
FIG. 2 is a front view of the elements provided in the stripping station.
Figure 3:
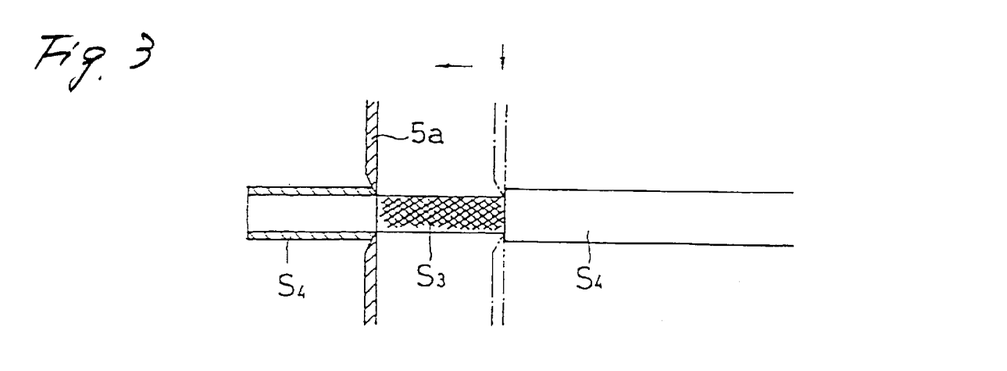
FIG. 3 is a view showing the outer jacket stripping process.
Figure 4:
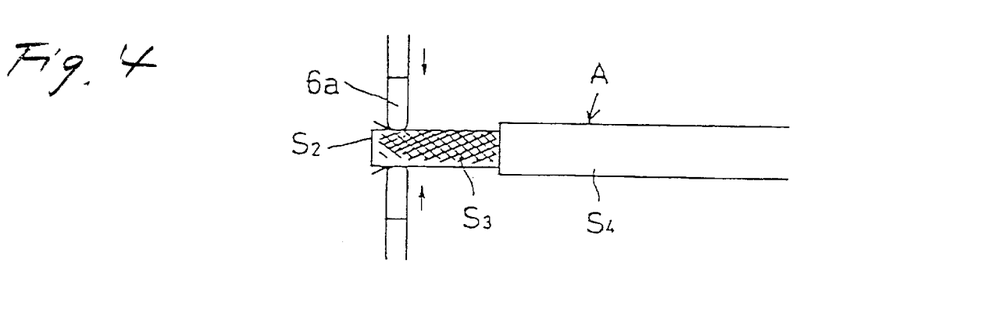
FIG. 4 is a view showing the braided sheath with the tip portion widened.

The wire A is registered at the stripping station (not shown) with the tip abutted against the stop and held at the clamping unit 1 shown in FIG. 1. The outer jacket $S_4$ is formed with an annular incision by means of the stripping blade 5a of the stripping mechanism 5 shown in FIG. 2, and then the blade 5a is urged to the position shown by a chain line in FIG. 3 by a slider (not shown) to strip off the outer jacket being cut by the blade. Then the braided sheath $S_3$ in the vicinity of the tip is press-deformed by a presser 6a of the pressing mechanism 6 shown in FIG. 2 and widened outwardly as shown in FIG. 4. A clamp 7a of the clamping mechanism 7 (FIG. 2) having grooves where the wire is received grasps the portion of the braided sheath $S_3$ not to be removed, and then a cylindrical body 8 supported by a slider (not shown as well) is inserted from the tip side of the wire between the braided sheath S3 and the internal insulating material $S_2$ to further widen the tip of the braided sheath $S_3$ into the shape of a funnel.

Since the processing at the stripping station may be achieved by applying general stripping technique and the principle of sheath widening operation of the apparatus proposed in the Unexamined Japanese Patent Application Publication No. Hei 2000-102133 and is not the part characterizing the present invention, only a brief description is presented as regards the construction of the apparatus.

Upon completion of the processing described above, the slider 3 shown in FIG. 1 is moved to the braided sheath cutting station of the next stage while holding the wire A.

The cutting apparatus provided on the cutting station is shown in FIG. 6 to FIG. 9.

Figure 6:
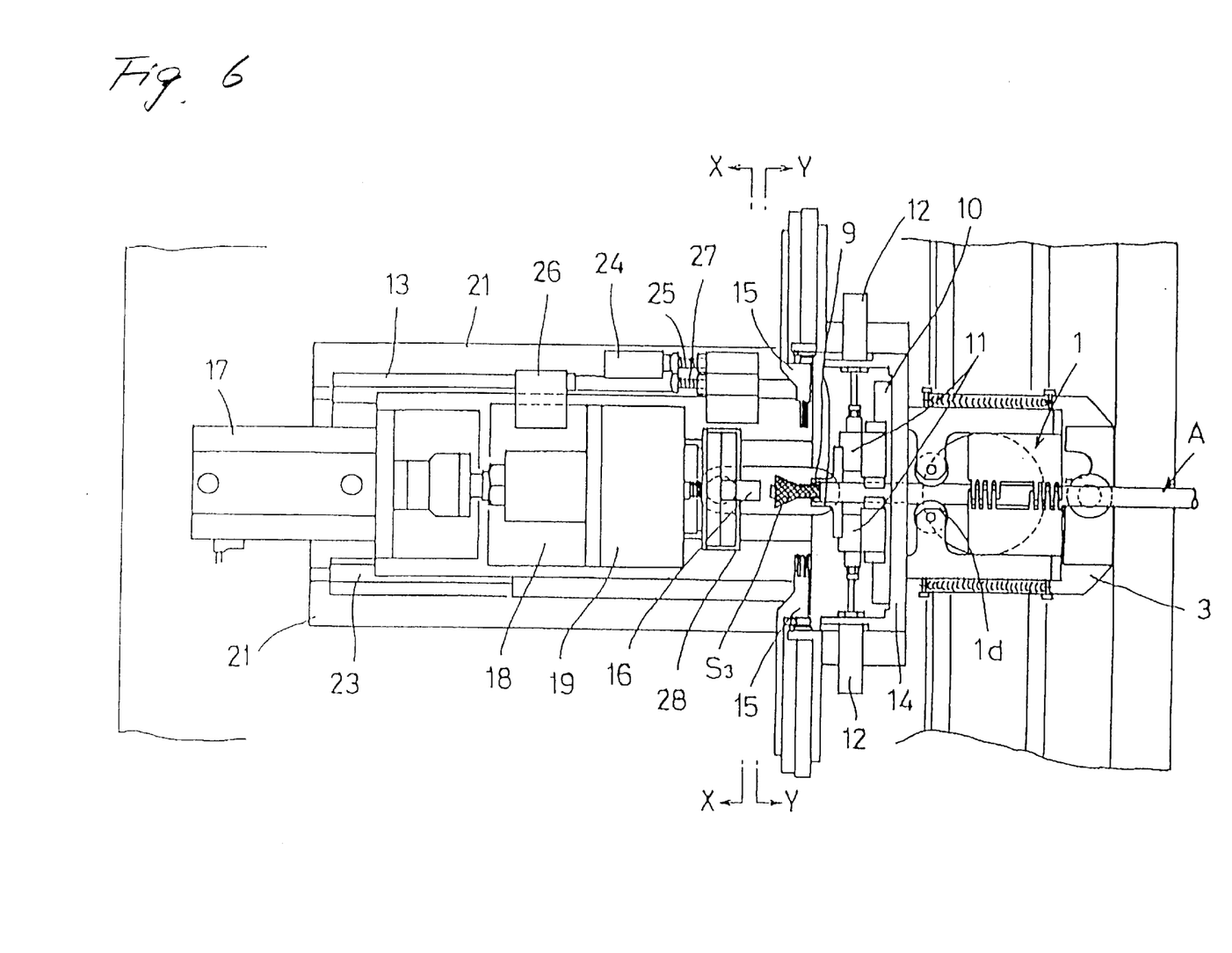
FIG. 6 is a plan view of the cutting apparatus of an embodiment.

Reference number 9 in FIG. 6 and FIG. 7 depicts internal blades disposed in the shape of a two-piece cylinder. Each half of the internal blades 9 is mounted on two sliders 11 guided by the linear guide 10 respectively, and opened and closed by driving each slider 11 with a cylinder. The linear guide 10 is fixed on the end surface of the supporting plate 14 which is mounted vertically on the table 13.

Figure 8:
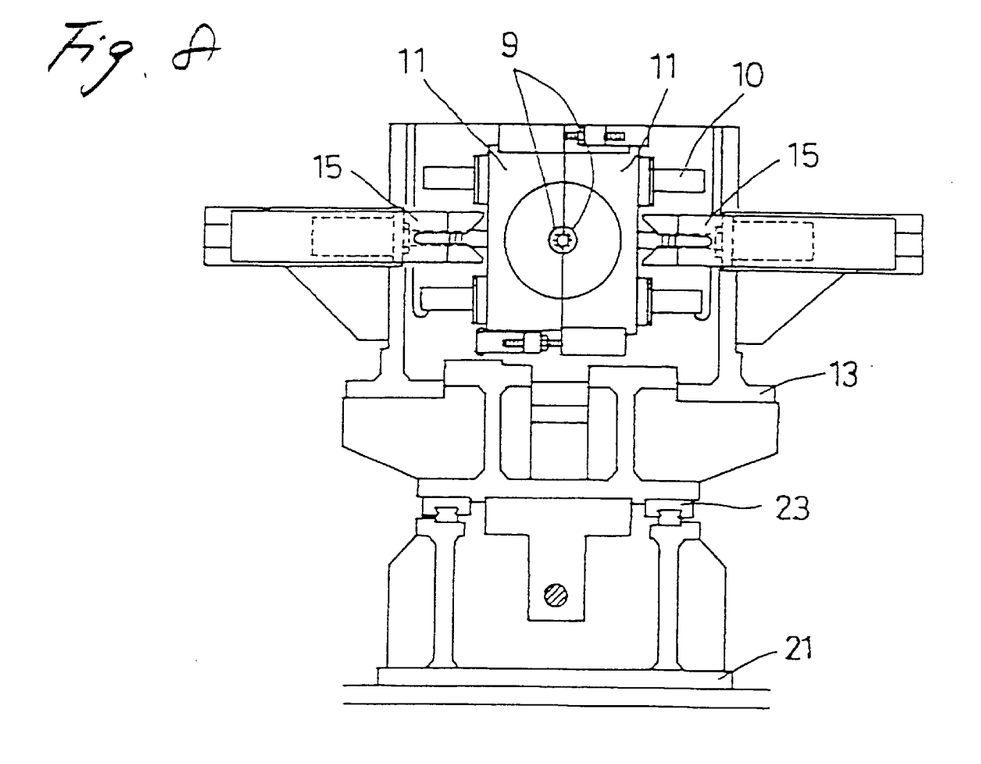
FIG. 8 is a cross sectional view taken along the line X—X of FIG. 6.

Reference number 15 in FIG. 6 and FIG. 8 depicts a centering chuck employed as a preferred element, which is provided on the table 13.

Figure 9:
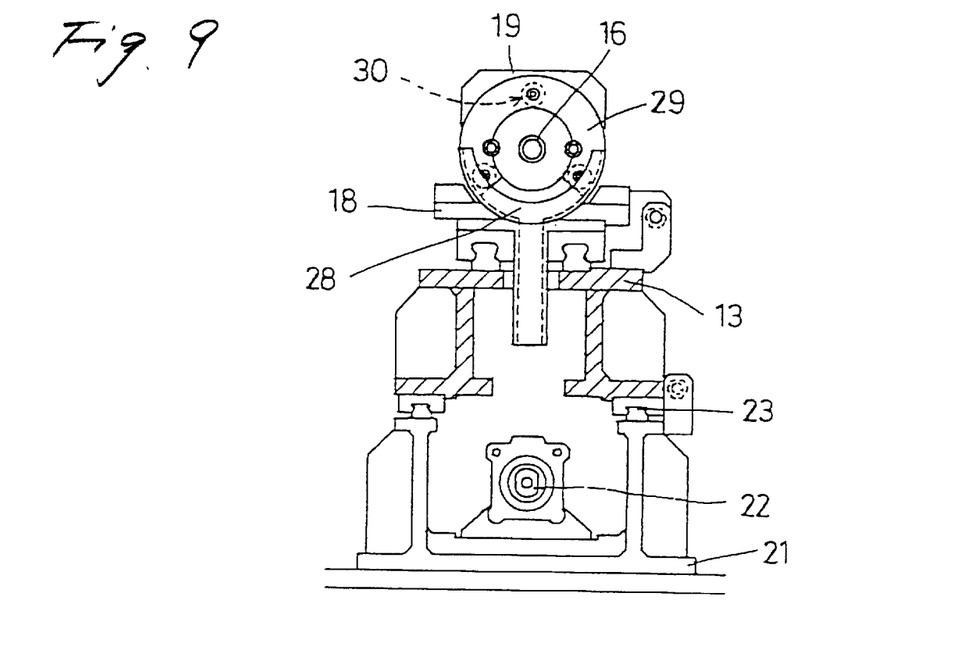
FIG. 9 is a cross sectional view taken along the line Y—Y of FIG. 6.

Reference number 16 in FIG. 6, FIG. 7, and FIG. 9 is a cylindrical external blade opposed to the internal blades 9. The external blade 16 is slidably mounted in the hole formed on a holder block 19 mounted on the slider 18 which is driven by the cylinder 7 and moves forward and backward longitudinally of the wire, and is energized toward the internal blades 9 by a spring 20.

The slider 18 is mounted on the table 13. The table 13 is moved forward and backward longitudinally of the wire by means of the cylinder 22 and a linear guide 23 on the baseboard 21, so that the relative position of the internal blades 9 and the external blade 16 and the wire A is changed by moving the slider 18 forward and backward. The forward and backward movement of the slider 18 also changes the relative positioning of the inner blades 9 and the outer blade 16.

The end point of the forward movement of the table 13 may be determined by abutting a stop 24 mounted thereon, FIG. 6, against an adjusting bolt 25 provided on the baseboard 21. The end point of the movement of the slider 18 may also be determined by abutting the stop 26 mounted thereon against the adjusting bolt 27 provided on the table 13 in the same manner. Therefore, adjusting the tightness of the adjusting bolts 25 and 27 can change the length of the braided sheath to be stripped off.

Reference number 28 in FIG. 7 depicts a suction unit disposed under the external blade 16. In the suction unit for collecting the chips of the braided sheath, the outlet of the suction unit is connected to the suction unit (not shown) through a flexible conduit. Reference number 29 in the figures depicts a supporting ring mounted on the upper side of the suction unit 28 to support the holder block 19 via a slide guide 30 (the slide guide shown in the figure comprises a bushing 30a to be fixed on the holder block 19, a slide pin 30b for guiding by the use of the bushing, and a compression spring 30c).

Figure 10:
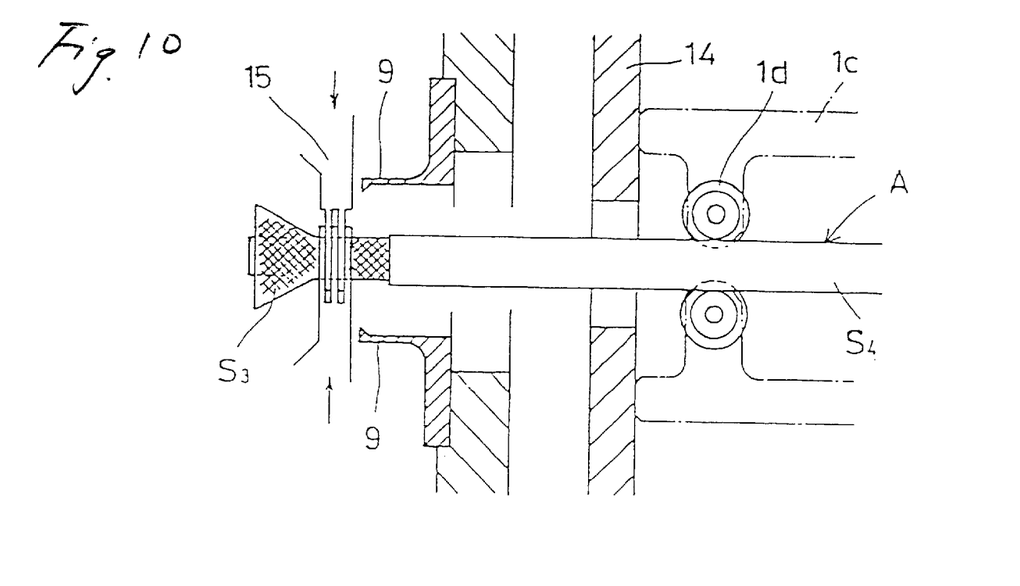
FIG. 10 is a plan view viewing from the level of vision illustrating the tip of the wire held by the centering chuck.

The operation of the cutting apparatus will now be described. When the clamping unit 1 moves from the stripping station of the previous stage to the cutting station while holding the wire, the table 13 is already in the retracted position where the supporting plate 14 (FIG. 6, FIG. 7) does not interfere the tip of the wire A, and the internal blades 9 are in the opened state. When the clamping unit 1 stops at the cutting station and registered, the table 13 in FIG. 7 moves forward to the side of the wire A, and at the same time the arms 1c of the clamping unit move backward by being pressed by the supporting plate 14. During this movement, the wire A does not move and thus the distance between the tip and the supported point of the wire becomes longer, which may result in misregistration of the tip portion of the wire A. For this reason, the tip of the wire A is centered in advance by the centering chuck 15 and remained in this state, and then the table 13 is moved forward to urge the internal blades 9 to the preset position (FIG. 10).

Figure 11:
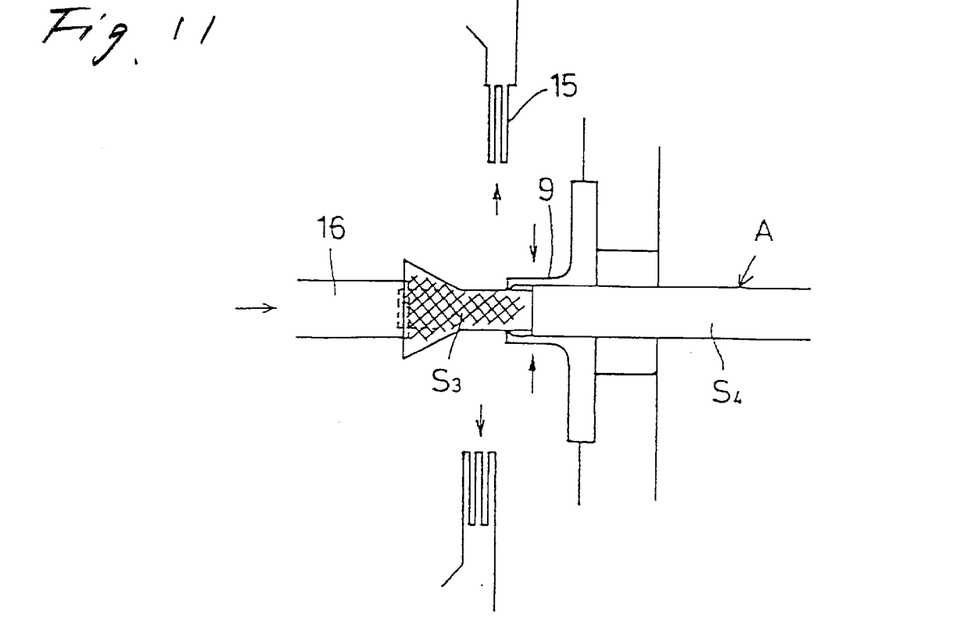
FIG. 11 is a diagrammatic view illustrating the initial action taken in the cutting sequence of the braided sheath.
Figure 12:
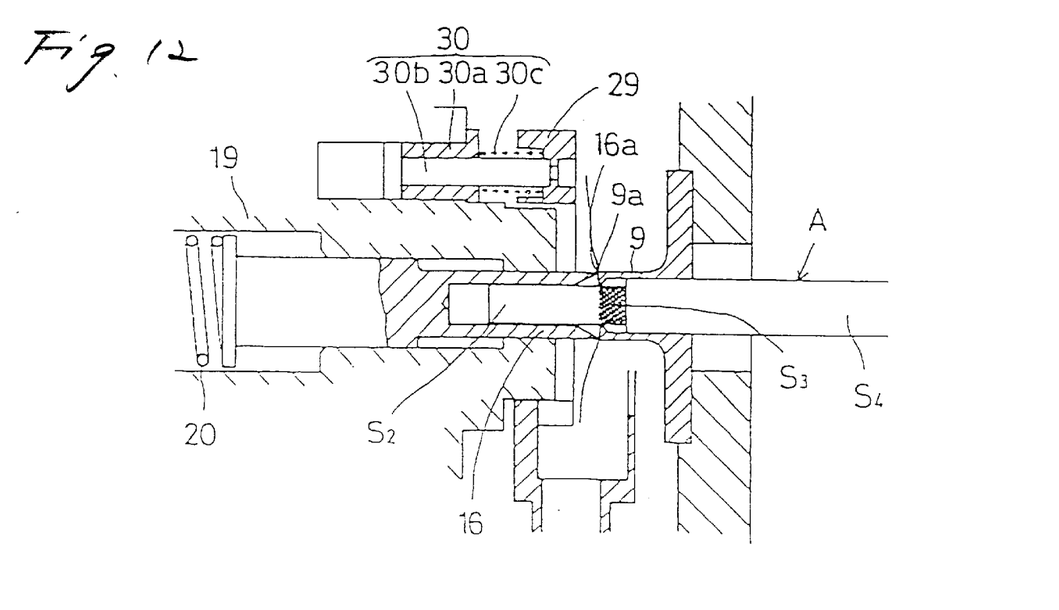
FIG. 12 is a diagrammatic view illustrating the state where the braided sheath is being cut.

Then the internal blades 9 divided into two portions close and hold the periphery of the portion of the braided sheath S3 not to be removed, while the slider 18 in FIG. 7 is driven to urge the external blade 16 forward, and once the tip of the cylindrical portion of the external blade 16 is fitted into the tip of the wire A, the centering chuck 15 is opened and retracted (FIG. 11).

Subsequently, by squeezing the external blade 16 between the braided sheath $S_3$ and the internal insulating material $S_2$, the braided sheath $S_3$ isolated from the internal insulating material $S_2$ is caught between the blade 9a of the internal blades 9 and the blade 16a of the external blade 16 and then cut off. During this operation, since the external blade 16 stays in the holder block in partway the internal blades 9 and the external blade 16 are protected through buffer action of the spring 20.

Figure 13:
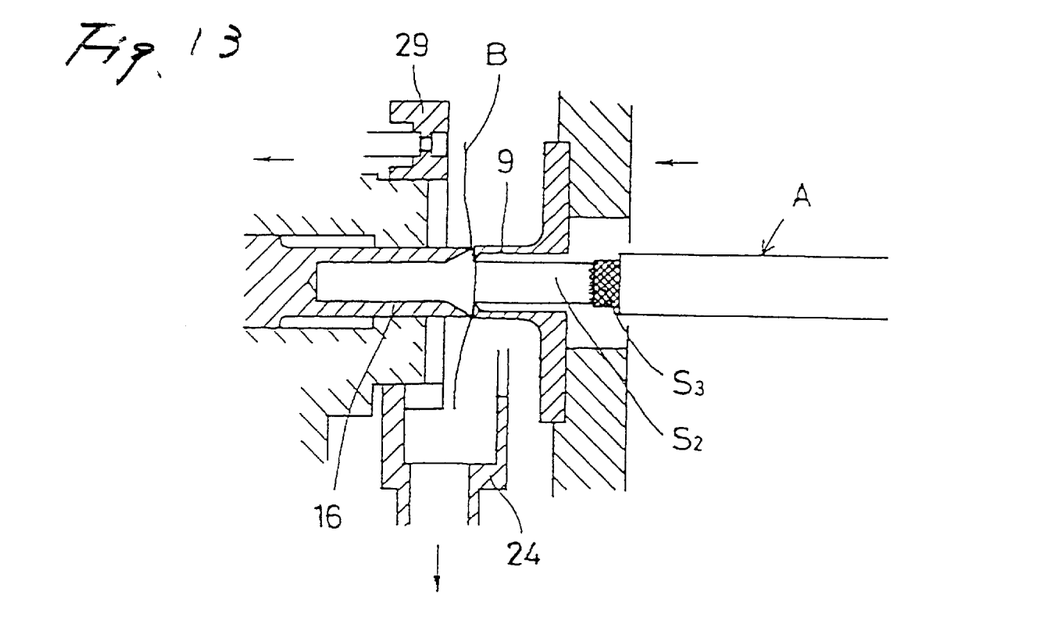
FIG. 13 is a diagrammatic view illustrating the state where the chip of the braided sheath is being stripped off.

Upon completion of the cutting operation of the braided sheath, the slider 18 in FIG. 7 is withdrawn and the external blade 16 is retracted. During this operation, since the chip of the braided sheath has a tendency to stay on the wire A, the table 13 is withdrawn and forces the internal blades 9 to follow the retraction of the external blade 16 and strip the chip of the braided sheath B off the wire A (FIG. 13). When the external blade 16 comes out of contact from the wire A and further moves backward, the chip stripped off the wire A falls down because there is nothing to support it any more, and will be sucked into the suction unit 24 and collected therein.

Since the cutting operation is now completed, the internal blades 9 open, and other elements go back to their initial positions. Subsequently, the wire A is fed to the processing station of the next stage and processed as required, and then fed to the initial stripping station again where the internal insulating material $S_2$ is stripped off by the prescribed length with the stripping blade 31a of the stripping mechanism 31 shown in FIG. 2 to complete entire operation of the terminal processing.

Although all the cylinders employed in the cutting apparatus of the embodiment shown here are air cylinders, it is not limited thereto.

Figure 5:
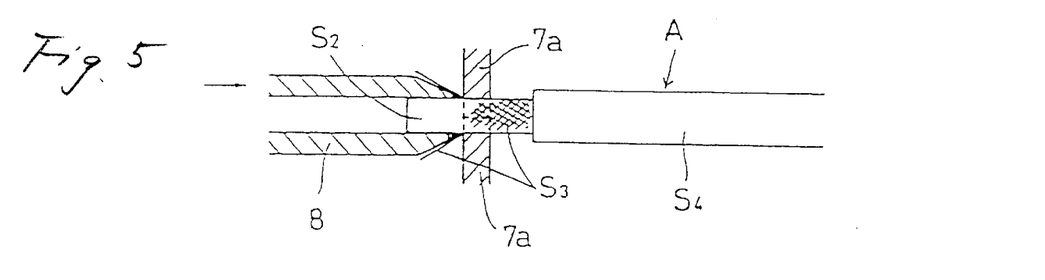
FIG. 5 is a view showing the braided sheath with the tip portion further widened in the shape of a funnel.

The cutting apparatus of the present invention may be applied to wires of various sizes by replacing the cylindrical body 8 of FIG. 5 and the internal blades 9 and the external blade 16 in FIG. 7 with ones having the right sizes correspondingly.

As described so far, in the cutting method and the cutting apparatus proposed in the present invention, the braided sheath is cut off after being isolated from the internal insulating material, and thus the internal insulating material is not subject to damage. Therefore, reduction in reliability of products (wire harness) including a shielding wire with terminals or the like provided on the terminal thereof may be prevented.

In addition, since the length of the braided sheath to be stripped off may be changed freely by changing the point on the portion of the braided sheath not to be removed held by the internal blades, the limitation imposed by the processing conditions may be loosened and thus the wide range of use may be established.

The apparatus further comprising a suction unit for the chips of the braided sheath may prevent troubles such as environmental deterioration caused by chips being littered, or shut-down of the apparatus caused by chips entangled therein.

What is claimed is:

1. An apparatus for cutting a braided sheath of a shielding wire, said wire having a longitudinal axis, said apparatus comprising;
   a stripping mechanism that strips an outer jacket of a shielding wire;
   a clamping mechanism that registers and clamps the shielding wire to resist axial movement thereof;
   a widening mechanism that widens a tip of the braided sheath; and
   a cutting mechanism having a first blade element in the shape of a multi-piece cylinder and a second blade element supported by a slider and opposed to said first blade element, wherein said first blade element is provided around a periphery of a portion of the braided sheath to be retained, said second blade element is insertable between the braided sheath and an internal insulating material of the shielding wire, and said second blade element and said first blade element cooperate to cut a portion of said braided sheath isolated from said internal insulating material, and wherein the multi-piece cylinder constitutes the clamping mechanism.

2. The apparatus as set forth in claim 1, further comprising;
   a sliding mechanism that moves said first blade element along a longitudinal direction of the shielding wire; and
   a suction unit that collects chips of the braided sheath obtained during cutting.

3. The apparatus as set forth in claim 2, wherein said first blade is moveable toward said second blade element to remove a chip of the braided sheath.

4. The apparatus as set forth in claim 1, wherein said widening mechanism has at least one pressing element that presses radially inward against the sheath in the vicinity of the tip thereof.

5. The apparatus as set forth in claim 1, wherein said clamping mechanism has grooves of a semi-circular cross-section.

6. A method for cutting a braided sheath of a shielding wire having a longitudinal axis, comprising:
   stripping an outer jacket of the shielding wire to expose the braided sheath;
   widening a tip of the exposed braided sheath into a funnel shape;
   clamping a periphery of a portion of the braided sheath not to be removed with a first blade element in the shape of a multi-piece cylinder to resist axial movement of the shielding wire;
   providing a cylindrical second blade element opposed to the first blade element along a longitudinal direction of the shielding wire;
   inserting said second blade element from a terminal side of the wire between the braided sheath and an internal insulating material of the shielding wire; and
   cutting a portion of the braided sheath isolated from the internal insulating material with said second blade element and said first blade element.

7. The method for cutting a braided sheath of a shielding wire of claim 6, further comprising:
   retracting the second blade element upon completion of the cutting operation;
   moving the first blade element toward the second blade element to remove a cut chip of braided sheath; and
   collecting the chip of braided sheath with a suction unit.

* * * * *